(12) United States Patent
Borissov et al.

(10) Patent No.: US 6,708,905 B2
(45) Date of Patent: Mar. 23, 2004

(54) SUPERSONIC INJECTOR FOR GASEOUS FUEL ENGINE

(75) Inventors: Anatoli A. Borissov, Sugarland, TX (US); James J. McCoy, Jr., Spring, TX (US)

(73) Assignee: Emissions Control Technology, LLC, Houston, TX (US)

( * ) Notice: Subject to any disclaimer, the term of this patent is extended or adjusted under 35 U.S.C. 154(b) by 0 days.

(21) Appl. No.: 09/728,425

(22) Filed: Dec. 1, 2000

(65) Prior Publication Data

US 2001/0025892 A1 Oct. 4, 2001

Related U.S. Application Data

(60) Provisional application No. 60/168,921, filed on Dec. 3, 1999.

(51) Int. Cl.$^7$ .................................................. B05B 1/30
(52) U.S. Cl. .................... 239/584; 239/533.3; 239/548; 239/589; 123/527
(58) Field of Search ............... 239/533.3, 548, 239/567, 584, 589, 589.1, DIG. 3; 123/525, 526, 527, 528, 529; 60/39.465, 39.49, 39.77, 249

(56) References Cited

U.S. PATENT DOCUMENTS

| | | | |
|---|---|---|---|
| 3,517,510 A | * | 6/1970 | Melenric ..................... 60/249 |
| 3,628,726 A | | 12/1971 | Johnson et al. |
| 3,823,554 A | * | 7/1974 | Melenric ..................... 60/249 |
| 4,006,719 A | | 2/1977 | Kanda et al. |
| 4,094,469 A | | 6/1978 | Woringer |
| RE30,720 E | * | 8/1981 | Sohre ..................... 239/589 X |
| 4,338,897 A | | 7/1982 | Drumheller et al. |
| 4,341,351 A | | 7/1982 | DeLuca |
| 4,383,198 A | | 5/1983 | Hosking |
| 4,566,634 A | * | 1/1986 | Wiegand ........... 239/533.12 X |
| 4,825,828 A | | 5/1989 | Schlunke et al. |
| 5,054,456 A | | 10/1991 | Rush, II et al. |
| 5,150,690 A | | 9/1992 | Carter et al. |
| 5,211,145 A | | 5/1993 | Ichikawa et al. |
| 5,222,993 A | | 6/1993 | Crane |
| 5,241,930 A | | 9/1993 | Dupler |
| 5,285,756 A | | 2/1994 | Squires |
| 5,295,816 A | | 3/1994 | Kobayashi et al. |
| 5,441,234 A | | 8/1995 | White et al. |
| 5,474,054 A | | 12/1995 | Povinger et al. |
| 5,542,392 A | | 8/1996 | Povinger |
| 5,549,083 A | | 8/1996 | Feuling |
| 5,566,712 A | | 10/1996 | White et al. |
| 5,611,316 A | | 3/1997 | Oshima et al. |
| 5,630,403 A | | 5/1997 | Van Kampen et al. |
| 5,639,022 A | | 6/1997 | Yanta et al. |
| 5,666,923 A | | 9/1997 | Collier, Jr. et al. |
| 5,673,673 A | * | 10/1997 | Beck ..................... 123/527 |
| 5,697,346 A | | 12/1997 | Beck |
| 5,713,336 A | | 2/1998 | King et al. |
| 5,752,481 A | | 5/1998 | Faulkner |
| 5,758,865 A | | 6/1998 | Casey |
| 5,775,289 A | | 7/1998 | Yoshida et al. |

(List continued on next page.)

FOREIGN PATENT DOCUMENTS

| | | |
|---|---|---|
| EP | 0370195 A1 | 5/1990 |
| EP | 0420599 A2 | 4/1991 |
| JP | 55-49566 A | 4/1980 |
| JP | 60-08456 A | 1/1985 |
| RU | 2155422 C1 | 8/2000 |
| WO | WO 83/00191 A1 | 1/1983 |
| WO | WO 87/00584 A1 | 1/1987 |
| WO | WO 92/05363 A1 | 4/1992 |
| WO | WO 02/02932 A1 | 6/2001 |

Primary Examiner—Steven J. Ganey
(74) Attorney, Agent, or Firm—Kurt L. Ehresman; Brian T. Sattizahn; McNees Wallace & Nurick

(57) ABSTRACT

A nozzle for delivering fuel to an engine is disclosed which is profiled with adjoining converging and diverging sections to accelerate the flow of fuel to a supersonic rate.

2 Claims, 3 Drawing Sheets

U.S. PATENT DOCUMENTS

| | | | |
|---|---|---|---|
| 5,782,414 A | * | 7/1998 | Nathenson ................. 239/589 |
| 5,787,864 A | | 8/1998 | Collier, Jr. et al. |
| 5,820,102 A | | 10/1998 | Borland |
| 5,829,418 A | | 11/1998 | Tamura et al. |
| 5,878,730 A | | 3/1999 | Williams |
| 5,887,567 A | | 3/1999 | White et al. |
| 5,899,194 A | | 5/1999 | Iwatsuku et al. |
| 6,026,787 A | | 2/2000 | Sun et al. |
| 6,035,822 A | | 3/2000 | Sucuk et al. |
| 6,073,862 A | | 6/2000 | Touchette et al. |
| 6,089,170 A | | 7/2000 | Conti et al. |
| 6,102,299 A | | 8/2000 | Pace et al. |
| 6,105,885 A | * | 8/2000 | Haas et al. ................. 239/589 |
| 6,112,513 A | | 9/2000 | Catt et al. |
| 6,161,783 A | | 12/2000 | Press |
| 6,196,204 B1 | | 3/2001 | Janich |
| 6,328,231 B1 | | 12/2001 | Ording et al. |
| 6,336,437 B1 | | 1/2002 | Baika et al. |
| 6,409,096 B2 | | 6/2002 | Popp |
| 6,427,670 B2 | | 8/2002 | Goto et al. |
| 6,463,907 B1 | | 10/2002 | Hiltner |
| 6,518,763 B2 | | 2/2003 | Sollart |

* cited by examiner

SUPERSONIC INJECTOR FOR GASEOUS FUEL ENGINE

BACKGROUND OF THE INVENTION

This invention relates to the injection of gaseous fuel into the combustion chamber of a gas engine. The injection of gas into a combustion chamber of current designs of gas engines occurs through the different types of orifices under pressures ($P_{inj}$) that range ~40–60 Psi. The pressure in cylinder ($P_{cyl}$) during the injection process is changing from ~20 to 60 Psi. The differential pressure $dP \leftrightarrow P_{inl} - P_{cyl}$, is small and consequently gives a small velocity of fuel jet and poor mixing. Some existing designs use high pressure, but still use orifices or pipe (constant area duct) for the nozzle. The flow in these orifices is choked flow, and as such, the velocity of fuel jet never exceeds the speed of sound. This speed of sound is calculated based on the local parameters in the outlets. So, there is a limitation of the velocity, and mixing, in existing designs. Thus, mixing is poor.

The present invention contemplates the use of an injection pressure that is always higher than maximum pressure in the cylinder at the end of the injection process. This pressure should be at least $P_{inj}$=85 Psi, for $P_{cyl}$=53 Psi. By using this level of injection pressure, it is possible to realize supersonic flow. The design of this invention is a profiled nozzle, which accelerates the flow to above Mach 1. As long as the pressure ratio satisfies $P_{inj}/P_{cyl}$>1.592 (for the Natural gas, Cp/Cv=1.31), supersonic flow can be achieved. To create such flow, a special profiling of the nozzle area is required. Gas dynamics theory described, for example, by Philip Thompson (Philip Thompson. *Compressible-Fluid Dynamics*, Department of Mechanical Engineering, Rensselaer Polytechnic Institute (1988), pp. 665) is used to profile the nozzle area. Generally, the nozzle will have a converging-diverging shape. For given pressure on the inlet there is acceleration of the flow in the converging part of the nozzle. At the minimum area of the nozzle, the critical area, the flow will reach maximum velocity which is still not more than sonic velocity. To accelerate the flow further, the nozzle must then begin to diverge. Applying the gas dynamic theory, the throat area can be calculated that is required to provide the required amount of fuel. For this the parameters on the nozzle inlet (pressure $P_{inl}$, temperature $T_{inl}$, velocity $V_{inl}$) are used. Then, for known parameters of throat and designed outlet pressure $P_{out}$, the outlet area is defined. The ratio of local gas flow speed to speed of sound (Mach number, M=V/C) in outlet will depend on the throat to the outlet area ratio (AR=$A^*/A_{out}$). It is recommended M~2.5–3. In this case, the flow on the outlet will be supersonic. Depending on the ambient pressure at the outlet, the flow could be over-expanded. If it is over-expanded, there will be shock waves, after which the pressure will take the value of ambient pressure.

ADVANTAGES

The first advantage is with a supersonic injector the jet flow velocity on outlet of the nozzle is the maximum for a given pressure on the inlet. It could be higher than the speed of sound, and much higher than for conventional injection devices.

Second, the high velocity of the jet creates highly turbulent flow and better entrapment of the cylinder air into the jet of gaseous fuel. This is due to interface instability of the jet in ambient air.

Third, this supersonic injector could be used in gas turbine engine which use the gaseous fuel.

Fourth, in the case of over-expanded flow, the existence and special configuration of shock waves will improve the mixing through increasing entropy and micro-scale vortex formation in the shock waves. The vortexes improve the mixing in a larger area and consequently make the combustion mixture more uniform. This mechanism is an additional to the interface instability.

Fifth, multiple supersonic nozzles for one fuel valve are used. The interaction of multiple jets radically increase the mixing of fuel and air in cylinder.

Sixth, the combined advantages allow preparing more uniform mixture for combustion, reducing the temperature and improving the combustion. As a result, for the lower injection pressure (100–150 Psi) it makes it possible to reduce Nox and increase the engine efficiency.

SUMMARY OF THE INVENTION

The subject of this invention is the design and use of a supersonic injector for a gas engine.

DESCRIPTION OF THE SPECIFIC EMBODIMENTS

Figure 1:
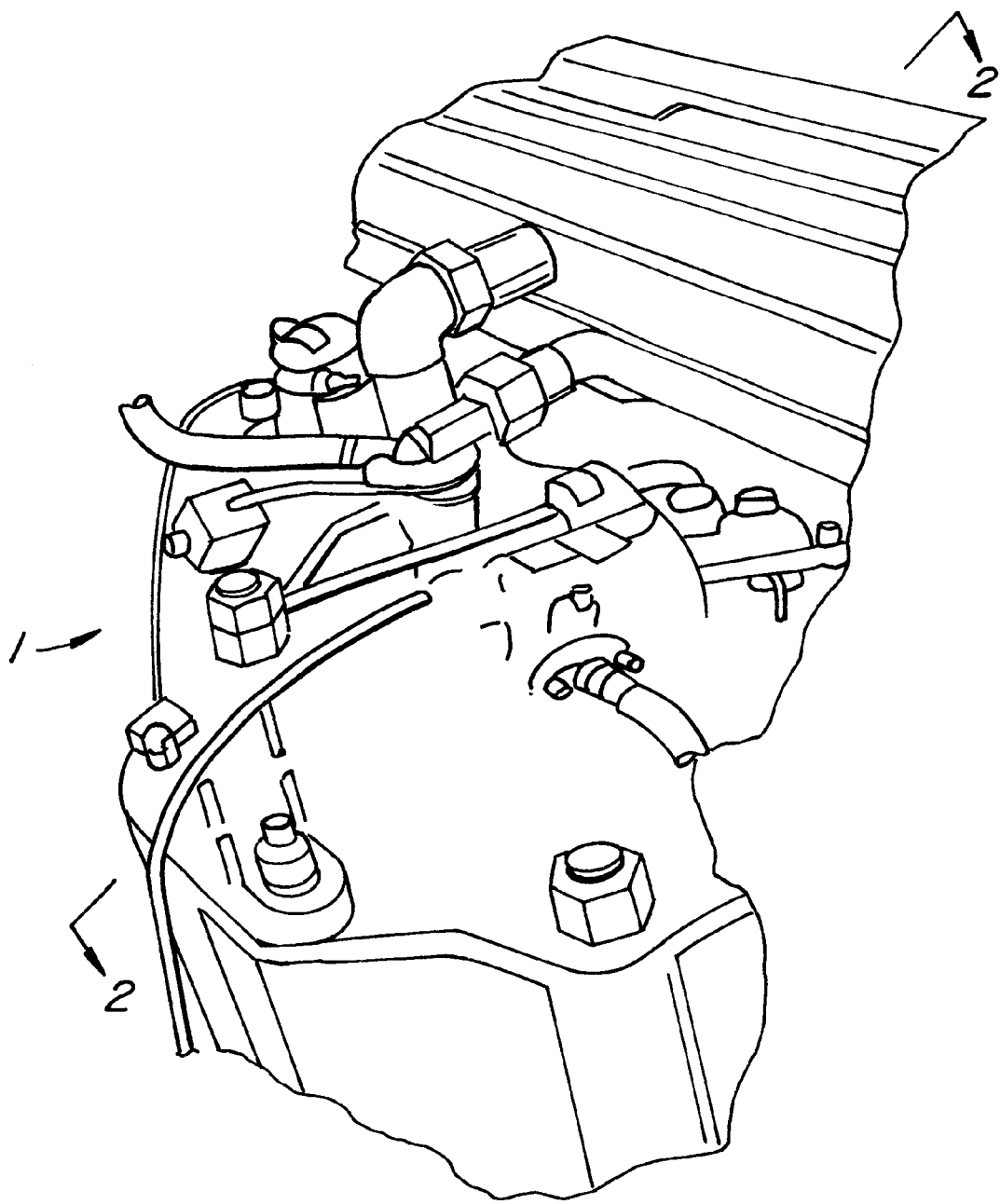
FIG. 1 is a perspective view of a portion of a cylinder of an engine in which the valve of this invention is located.
Figure 2:
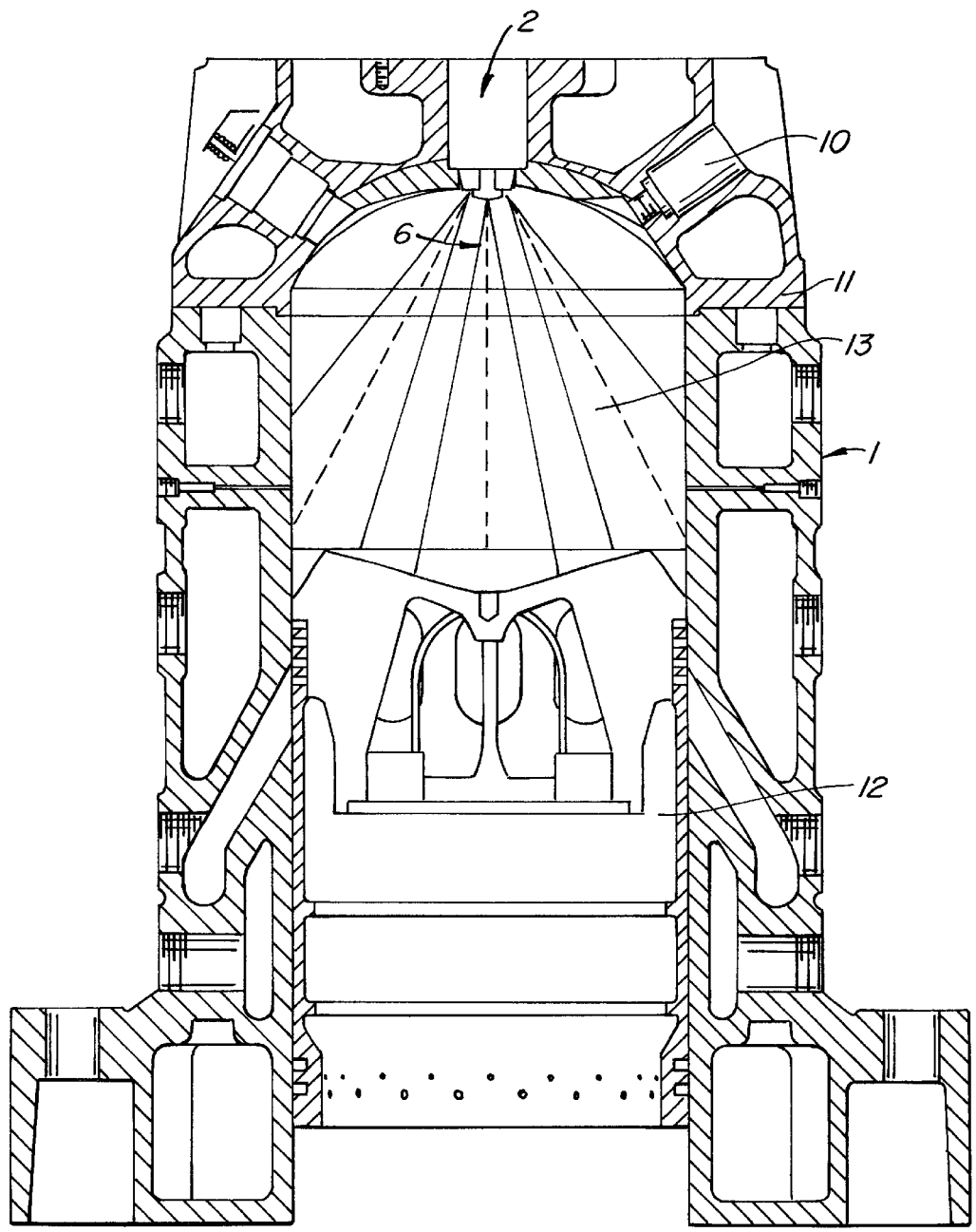
FIG. 2 is a cross-sectional view taken along line 2—2 of FIG. 1.
Figure 3:
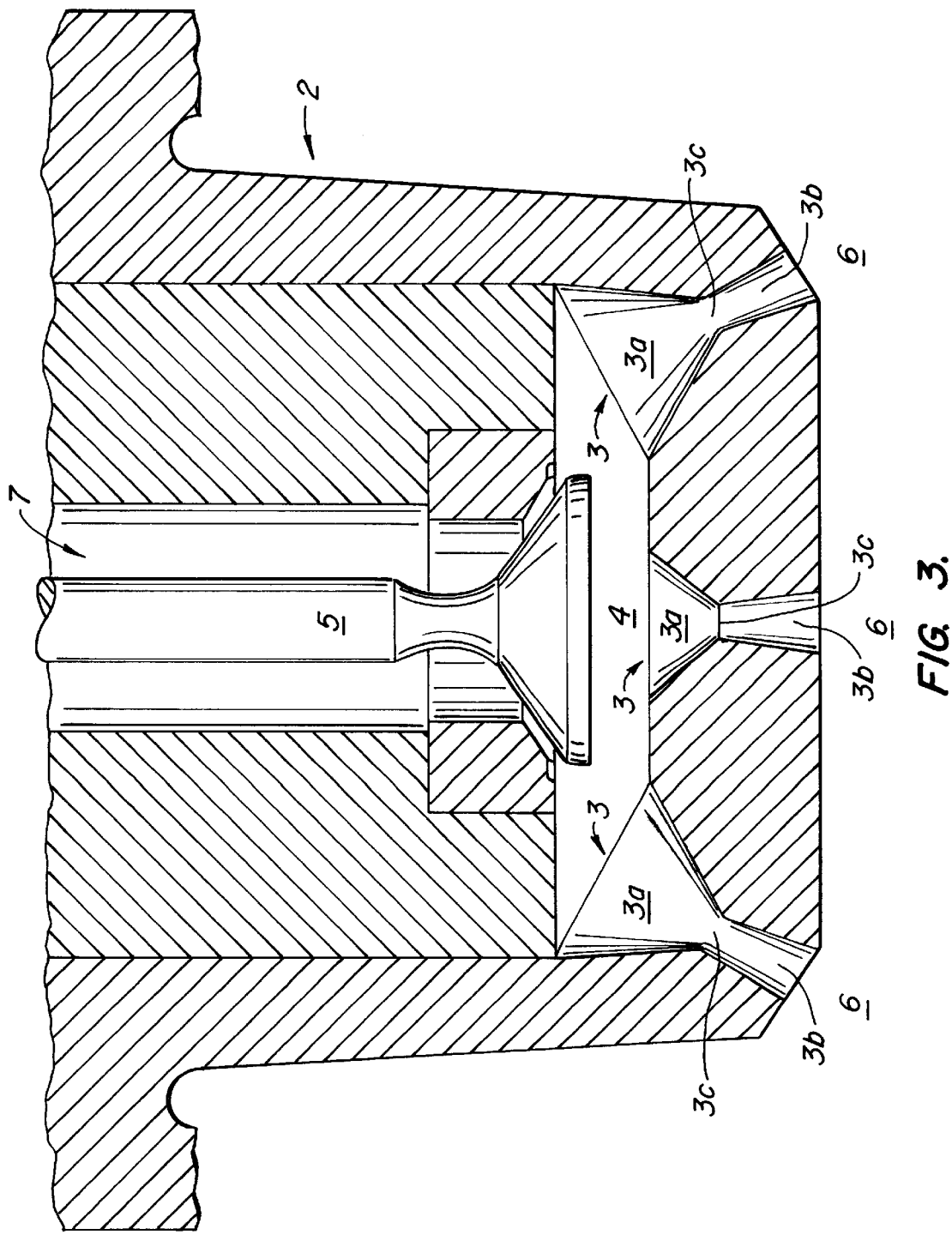
FIG. 3 is a cross-sectional view of one form of the valve of this invention.

This invention contemplates in a gaseous fuel engine having a cylinder, generally designated 1 (FIGS. 1, 2) in which resides a piston 12 which reciprocates toward and away from the cylinder head 11. Residing in head 11, the valve, generally designated 2, which incorporates a series of nozzles, generally designated 3 (FIG. 3) for delivering fuel to the combustion chamber 13 above piston 12 (FIG. 2). Valve 2 comprises three nozzles, generally designated 3 (FIG. 3), each having a converging section 3a, a diverging section 3b and a critical orifice 3c between sections 3a and 3b.

Valve 2 includes a valve actuator 5 at its inlet 7 from the fuel source and an antechamber 4 at its lower end which communicates with each of the nozzles 3. At the outlet end of diverging sections 3b which communicate with combustion chamber 13 there is a turbulent region 6.

In operation the nozzle will have a converging-diverging shape. For given pressure on the inlet there is acceleration of the flow in the converging part of the nozzle. At the minimum area of the nozzle, the critical area 3c, the flow will reach maximum velocity which is still not more than sonic velocity. To accelerate the flow further, the nozzle must then begin to diverge. Applying the gas dynamic theory, the throat area can be calculated that is required to provide the required amount of fuel. For this the parameters on the nozzle inlet (pressure $P_{inl}$, temperature $T_{inl}$, velocity $V_{inl}$) are used. Then, for known parameters of throat and designed outlet pressure $P_{out}$, the outlet area is defined. The ratio of local gas flow speed to speed of sound (Mach number, M=V/C) in outlet will depend on the throat to the outlet area ratio (AR=$A^*/A_{out}$). It is recommended M~2.5–3. In this case, the flow on the outlet will be supersonic. Depending on the ambient pressure at the outlet, the flow could be over-expanded. If it is over-expanded, there will be shock waves, after which the pressure will take the value of ambient pressure.

What is claimed is:

1. A supersonic nozzle for injecting gaseous fuel into the combustion chamber of a cylinder driven gaseous fuel engine, comprising:

a valve body having an inlet for receiving gaseous fuel and an outlet for delivering such fuel directly into such combustion chamber; and, said outlet having a converging section coupled to a diverging section through a critical orifice for delivering gaseous fuel therethrough at a supersonic rate directly into such combustion chamber.

2. The supersonic nozzle for injecting gaseous fuel into the combustion chamber of a cylinder driven gaseous fuel engine of claim 1, wherein:

the ratio of the cross-sectional area of said critical orifice to the cross-sectional area of said diverging section yields the supersonic rate of approximately Mach 2.5 to 3 (M~2.5–3).

* * * * *